(12) United States Patent
Jang et al.

(10) Patent No.: US 9,483,828 B2
(45) Date of Patent: Nov. 1, 2016

(54) SYSTEM FOR RECOGNIZING VEHICLE IDENTIFICATION NUMBER

(71) Applicant: HYUNDAI MOTOR COMPANY, Seoul (KR)

(72) Inventors: Yoon Jang, Incheon (KR); Jung Hoo Lim, Ulsan (KR)

(73) Assignee: HYUNDAI MOTOR COMPANY, Seoul (KR)

(*) Notice: Subject to any disclaimer, the term of this patent is extended or adjusted under 35 U.S.C. 154(b) by 21 days.

(21) Appl. No.: 14/540,805

(22) Filed: Nov. 13, 2014

(65) Prior Publication Data

US 2015/0294471 A1  Oct. 15, 2015

(30) Foreign Application Priority Data

Apr. 15, 2014  (KR) .................. 10-2014-0044916

(51) Int. Cl.
  *G06K 9/00* (2006.01)
  *G06K 9/36* (2006.01)
  *G06T 7/00* (2006.01)
  *G06K 9/32* (2006.01)

(52) U.S. Cl.
  CPC ........... *G06T 7/0051* (2013.01); *G06K 9/3258* (2013.01); *G06T 7/0002* (2013.01); *G06K 2209/01* (2013.01); *G06K 2209/19* (2013.01); *G06T 2207/10008* (2013.01); *G06T 2207/10012* (2013.01)

(58) Field of Classification Search
  CPC .............. G06T 7/0051; G06T 7/0002; G06T 2207/10012; G06T 2007/10008; G06T 7/0075; G06T 7/0022; G06K 9/3258; G06K 2209/01; G06K 2209/19; H04N 13/0239; H04N 2013/0081
  USPC ....... 382/154, 104, 105, 169, 173, 232, 237; 701/2; 715/205; 340/106; 283/72, 74, 283/75, 91, 68, 901, 904
  See application file for complete search history.

(56) References Cited

U.S. PATENT DOCUMENTS

| | | | | |
|---|---|---|---|---|
| 7,302,085 B2* | 11/2007 | Sasaki | ................. | G06K 9/3258 348/135 |
| 8,577,088 B2* | 11/2013 | Hofman | ............... | G06K 9/6282 382/104 |
| 8,633,954 B2* | 1/2014 | Raksha | .................. | B05D 3/207 347/153 |
| 8,873,807 B2* | 10/2014 | Calman | .............. | G06K 9/00791 382/103 |
| 9,036,040 B1* | 5/2015 | Danko | .................... | H04N 5/225 348/222.1 |
| 2014/0064564 A1* | 3/2014 | Hofman | ............... | G06K 9/6282 382/105 |
| 2014/0263674 A1* | 9/2014 | Cerveny | .......... | G06K 19/06028 235/494 |
| 2014/0270385 A1* | 9/2014 | Nepomniachtchi | .... | G06K 9/344 382/104 |

FOREIGN PATENT DOCUMENTS

JP  2007219943 A  8/2007

* cited by examiner

*Primary Examiner* — Sheela C Chawan
(74) *Attorney, Agent, or Firm* — McDermott Will & Emery LLP (57) ABSTRACT

A system for recognizing a vehicle identification number includes a three dimensional scanner configured to scan, in a direction in which the vehicle identification number is engraved, a vehicle identification number engraved in a vehicle body to obtain an image. The system further includes an image processor configured to convert the image obtained by the three dimensional scanner into a gray image, divide the gray image according to a gray scale to extract a symbol in the image corresponding to a symbol engraved in the vehicle body, and compare the symbol with standard symbols to determine the vehicle identification number.

13 Claims, 6 Drawing Sheets

SYSTEM FOR RECOGNIZING VEHICLE IDENTIFICATION NUMBER

CROSS-REFERENCE TO RELATED APPLICATION

This application claims priority to and the benefit of Korean Patent Application No. 10-2014-0044916 filed in the Korean Intellectual Property Office on Apr. 15, 2014, the entire contents of which are incorporated herein by reference.

TECHNICAL FIELD

The present disclosure relates to a system for recognizing a vehicle identification number, and more particularly, to a system for recognizing a vehicle identification number, which can enhance a correct recognition rate of a vehicle identification number engraved in a vehicle body and determine a depth of the vehicle identification number engraved in the vehicle body.

BACKGROUND

The vehicle body has the vehicle identification number that is a unique to the vehicle engraved in the vehicle body. In general, the vehicle identification number has a series of symbols with a combination of alphabet letters and numerals. In general, a vision system is used for determining whether the vehicle identification number engraved in the vehicle body is correct or not.

A related art vehicle identification number system is provided with a lighting for directing a light to an engraved surface, and a camera for taking a photograph of the light reflected at the engraved surface to recognize the vehicle identification number engraved in the vehicle body.

However, the related art vehicle identification number system has a problem in that, if the camera takes an image of the vehicle identification number having a contaminated vehicle body surface, a vehicle identification number recognition error takes place in a step of converting the image into a binary data.

Another problem with the aforementioned system is that irregular reflection at a portion of the vehicle identification number on the engraved surface caused by variation of the position of the lighting results in a failure to correctly identify the vehicle identification number from the image the camera had taken.

Moreover, there has been another problem in that a light quantity reflected at the engraved surface varied with the position of the lighting directed to the vehicle body requires many standard patterns of symbols for recognition of the same symbol.

Moreover, another problem with the related art vehicle identification number system is that it cannot perceive an engraved depth of the vehicle identification number because the camera takes a two-dimensional image.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a system for recognizing a vehicle identification number having the advantage of enhanced correct recognition rate of vehicle identification number engraved in a vehicle body. According to an embodiment of the present disclosure, an object of the present disclosure is to provide a new vehicle identification number recognition system for enhancing a correct recognition rate of a vehicle identification number engraved in a vehicle body.

Another object of the present disclosure is to provide a new vehicle identification number recognition system which can determine an engraved depth of the vehicle identification number in a vehicle body.

To achieve the objects of the present disclosure, a system for recognizing a vehicle identification number may include a three dimensional scanner configured to scan, in a direction the vehicle identification number is engraved, the vehicle identification number engraved in a vehicle body to obtain an image. The system may further include an image processor configured to convert the image obtained by the three dimensional scanner into a gray image, divide the gray image according to a gray scale to extract a symbol in the image corresponding to a symbol engraved in the vehicle body, and compare the extracted symbol with standard symbols to determine the vehicle identification number.

The image processor may be configured to extract a height profile from the image obtained by the three dimensional scanner. It may be configured to identify an engraved portion having the symbol engraved therein and a non-engraved portion having no symbol engraved therein. The image processor may be further configured to calculate an engraved depth of the symbol from an average height of the non-engraved portion and a lowest height of the engraved portion.

The image processor may be configured to determine a portion of the height profile having a slope lower than a reference value as the non-engraved portion having no symbol engraved therein and extract an average value of the non-engraved portion.

The image processor may be configured to determine a portion of the height profile having the slope higher than the reference value in a direction the vehicle identification number is scanned to be a burr formed portion.

The image processor may be configured to determine a portion of the height profile formed in a direction opposite to the slope of the height profile of the burr formed portion as the engraved portion, calculate a lowest height of the profile of the engraved portion, and determine a difference between the average height of the non-engraved portion and the lowest height of the engraved portion as a engraved depth of the symbol.

In certain embodiments, the system for recognizing a vehicle identification number may further include a transferrer configured to transfer the three dimensional scanner in the direction the vehicle identification number is engraved and a motion controller configured to control the transferrer.

In certain embodiments, the abovementioned symbol may be a letter. In other embodiments, the symbol may be a numeral, or another symbol.

In another exemplary embodiment of the present disclosure, a method for recognizing a vehicle identification number includes scanning a vehicle identification number engraved in a vehicle body to obtain a three dimensional image, where the vehicle identification number is scanned in the direction in which it is engraved. The method may further include recognizing the vehicle identification number from the image by carrying out a series of steps. These steps may include converting the three-dimensional image into a gray image, dividing the gray image converted thus according to a gray scale to extract a symbol, and comparing the extracted symbol to standard symbols to determine the vehicle identification number.

The method may further include the step of extracting a height profile from the three dimensional image. It may additionally include the step of identifying an engraved portion having the symbol engraved therein and a non-engraved portion having no symbol engraved therein, and calculating an engraved depth of the symbol from an average height of the non-engraved portion and a lowest height of the engraved portion.

The step for calculating the engraved depth may include the determining a portion of the height profile to be a burr formed portion if the slope of the height profile is higher than a reference value in a direction the vehicle identification number is scanned. It may further include determining a portion of the height profile with the slope formed in a direction opposite to the burr formed portion adjacent thereto as the engraved portion having the symbol engraved therein, and calculating the lowest height of the engraved portion. Additionally, it may include determining a portion of the height profile with the slope lower than the predetermined value as the non-engraved portion having no symbol engraved therein and calculating the average height of the non-engraved portion. It may also include calculating an engraved depth of the symbol from a height difference of the lowest height of the engraved portion and the average height of the non-engraved portion.

The above mentioned symbols may be letters, numerals, or other symbols.

Thus, the system for recognizing a vehicle identification number in accordance with an exemplary embodiment of the present disclosure has the following advantages. Since the image of the vehicle identification number engraved in the vehicle body is obtained with the three dimensional laser scanner, a correct recognition rate of the vehicle identification number can be enhanced.

And, since the image of the vehicle identification number is obtained by moving the three dimensional laser scanner in the direction the vehicle identification number is engraved, the light quantity of the light reflected at the surface of the vehicle body having the vehicle identification number engraved therein can be kept the same. Eventually, registration of only one standard symbol pattern for one symbol is made possible.

Moreover, the engraved depth of the engraved symbol can be calculated by using a engraving characteristic of the vehicle identification number.

BRIEF DESCRIPTION OF THE DRAWINGS

The attached drawings illustrate exemplary modes of the present disclosure, provided for describing the present disclosure in more detail, but not for limiting technical aspects of the present disclosure.

DETAILED DESCRIPTION OF THE EMBODIMENTS

The present inventive concept will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Parts not relevant to the present disclosure will be omitted for describing the present disclosure clearly, and throughout the specification, identical or similar parts will be given the same reference numbers.

The present disclosure is not limited to the drawings as shown, but rather the thicknesses of various elements may be enlarged in order to clearly show different parts and regions.

Figure 1:
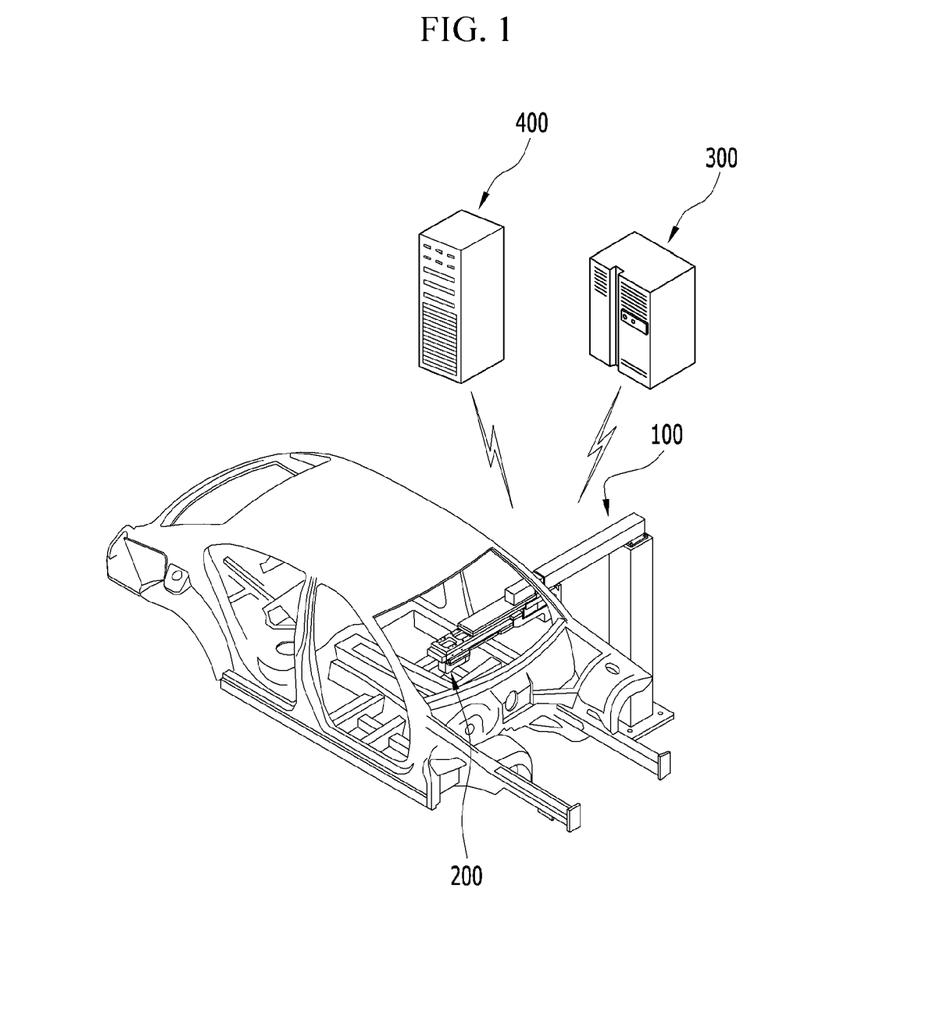
FIG. 1 illustrates a schematic view of a vehicle identification number recognition system in accordance with an exemplary embodiment of the present disclosure.

FIG. 1 illustrates a schematic view of a vehicle identification number recognition system in accordance with an exemplary embodiment of the present disclosure. And, FIG. 2 illustrates a schematic view showing a method for obtaining an image of a vehicle identification number by using a vehicle identification number recognition system in accordance with an exemplary embodiment of the present disclosure.

Figure 2:
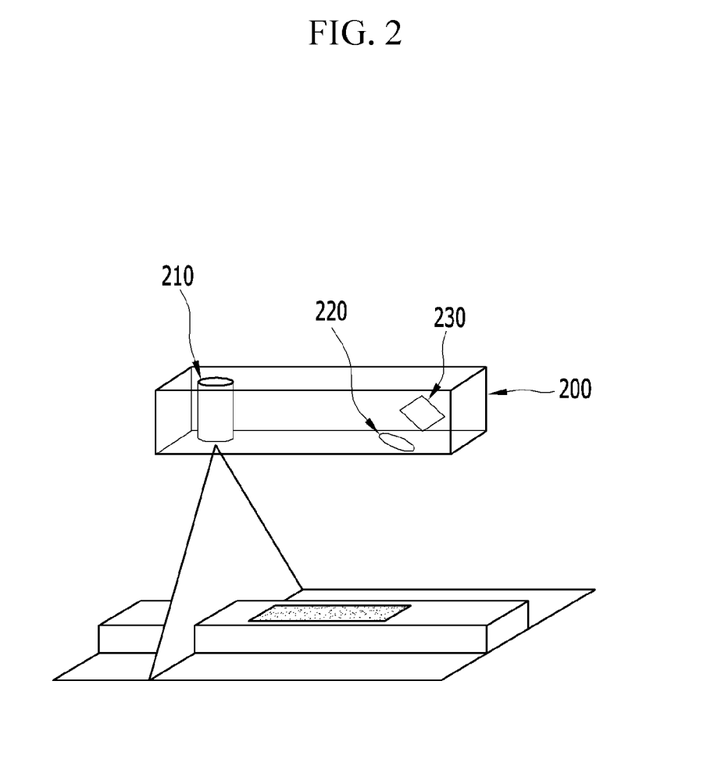
FIG. 2 illustrates a schematic view showing a method for obtaining an image of a vehicle identification number by using a vehicle identification number recognition system in accordance with an exemplary embodiment of the present disclosure.

Referring to FIGS. 1 and 2, the vehicle identification number recognition system may include a three dimensional scanner 200 for taking a three dimensional image, a transferrer 100 for transferring the three dimensional scanner 200, an image processor 400 for extracting a symbol from the image taken by the three dimensional scanner 200 in order to recognize a vehicle identification number, and a motion controller 300 for controlling the transferrer 100. Alternatively, the scanner may be transferred by some other means such as by hand, alleviating the necessity for a transferrer and a motion controller.

The three dimensional scanner 200 may include a beam director 210 for directing a laser beam, an image lens 220 for obtaining an image of the laser beam directed from the beam director 210 and reflected by a vehicle body, and an image sensor 230 for storing the image obtained at the image lens 220.

That is, the laser beam directed from the beam director 210 may be incident on the vehicle body having the vehicle identification number engraved therein, and the image lens 220 may obtain the laser beam reflected by the vehicle body as a three dimensional image. The three dimensional image obtained at the image lens 220 may be stored in the image sensor 230 and provided to the image processor 400 as required.

The system for recognizing a vehicle identification number may include a transferrer 100. In an embodiment, the transferrer 100 may make the three dimensional scanner 200 move in a direction the vehicle identification number is engraved. In certain embodiments, the three dimensional scanner 200 may obtain a few hundreds of frames of the image per second.

Since the three dimensional scanner 200 may obtain the image while moving in a direction in which the vehicle identification number is engraved, the image obtained with the three dimensional scanner 200 may be uniform regardless of illumination.

Figure 3:
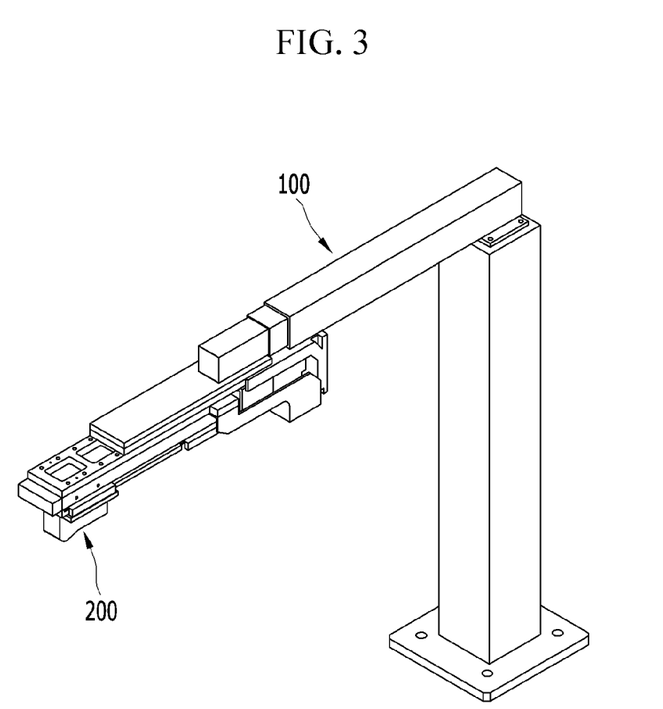
FIG. 3 is a schematic view of a transferrer in a vehicle identification number recognition system in accordance with an exemplary embodiment of the present disclosure.

Referring to FIG. 3, the transferrer 100 may have a motor and a telescopic arm to be movable in the direction the vehicle identification number is engraved. However, the transferrer 100 is not limited to this. Rather, it is apparent that the transferrer 100 may have other systems.

The image processor 400 recognizes the vehicle identification number engraved in the vehicle body from the three dimensional image the three dimensional scanner 200 obtains.

The image processor 400 may have at least one processor operated with a program set thereto for carrying out the steps of a method for recognizing a vehicle identification number in accordance with an exemplary embodiment of the present disclosure.

The steps of a process for recognizing a vehicle identification number from the image obtained at the three dimensional scanner 200 will be described with reference to the attached drawings, in detail.

FIGS. 4A~4D are schematic views showing the steps of an image correction method in accordance with an exemplary embodiment of the present disclosure.

Referring to FIGS. 4A~4D, in order to convert the image obtained by the three dimensional scanner 200 into binary data, the image may be divided into an engraved portion having the vehicle identification number engraved therein and a non-engraved portion having no vehicle identification number carved therein. The engraved portion is converted into white and the non-engraved portion is converted into black for converting the image into the binary data.

Figure 4:
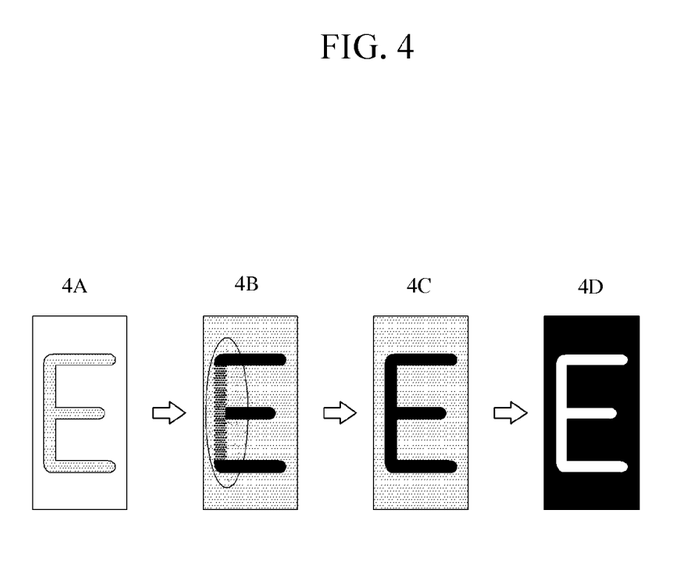
FIGS. 4A~4D are schematic views showing the steps of an image correction method in accordance with an exemplary embodiment of the present disclosure.

In an embodiment, the engraved portion and the non-engraved portion of the image (shown in FIG. 4A) obtained by the three dimensional scanner 200 may be converted into gray images in a range of 0-255 gray scale (See FIG. 4B).

The gray scale of the non-engraved portion of the image in FIG. 4B obtained by the three dimensional scanner 200 may have a value in a range of 100-200. The engraved portion of the same image may have a gray scale in a range of 200-255. An irregular reflection portion in FIG. 4B may have a gray scale in a range of 0-100.

In the embodiment illustrated in FIGS. 4A-D, the irregular reflection portion is processed to have the gray scale of 255 to correct the image as shown in FIG. 4C.

In the image corrected thus as shown in FIG. 4C, the engraved portion is given a binary numeral '1' to convert the engraved portion into 'white' and the non-engraved portion is given a binary numeral '0' to convert the non-engraved portion into 'black', thereby converting the image into the binary data (See FIG. 4D).

Then, the image processor 400 may compare the binary data of the converted image with that of standard symbols in order to recognize the vehicle identification number. In certain embodiments, the symbols may be letters, numerals, or a combination thereof.

Thus, by converting the image obtained by the three dimensional scanner 200 into gray scale, correcting the image, and converting the image into binary data, the vehicle identification number can be recognized easily.

Next, a process for calculating an engraved depth of the vehicle identification number from the three dimensional image obtained by the three dimensional scanner 200 will be described with reference to FIGS. 5A-C.

FIGS. 5A~5C are schematic views showing a method for calculating a engraved depth of a symbol by using a vehicle identification number recognition system in accordance with an exemplary embodiment of the present disclosure. The symbol may be a letter or a numeral, but is not limited thereto.

FIG. 5A illustrates an image of the vehicle identification number engraved in the vehicle body, FIG. 5B illustrates a graph of a height profile of an 'A' part in FIG. 5A, and FIG. 5C illustrates a graph of a height profile of a 'B' part in FIG. 5A.

An x-axis direction in each of FIGS. 5B and 5C is a direction of an arrow in FIG. 5A. In this case, the arrow direction is a direction in which the three dimensional scanner 200 scans the vehicle identification number.

Figure 5:
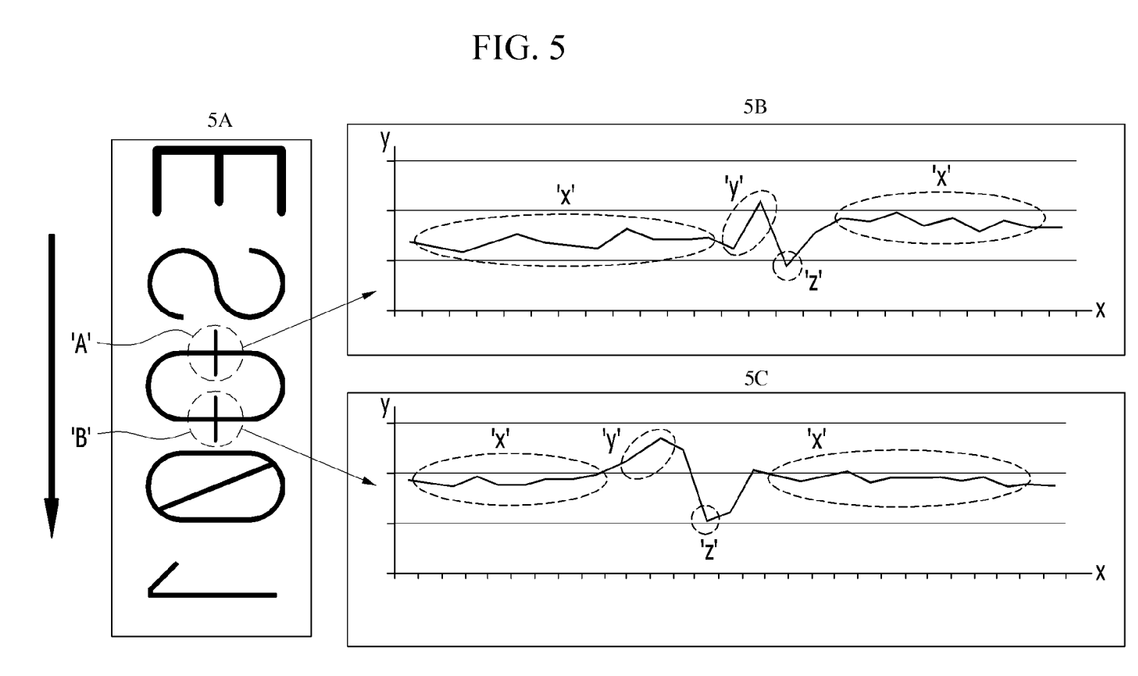
FIGS. 5A and 5B are schematic views showing a method for calculating an engraved depth of a symbol by using a vehicle identification number recognition system in accordance with an exemplary embodiment of the present disclosure.

Referring to FIG. 5, the height profile of a portion having the vehicle identification number engraved therein is extracted from the image taken by the three dimensional scanner 200.

The image processor 400 may calculate a slope of the height profile. If the slope calculated thus is lower than a reference value, a portion of the height profile having the slope is determined to be the non-engraved portion (See 'x' marked portions in FIG. 5B and 'x' marked portions in FIG. 5C). Then, an average height of the non-engraved portion is calculated.

In certain embodiments, if the slope has a value higher than the reference value in a positive direction, a portion of the height profile having the slope may be determined to be a burr formed portion (See a 'y' marked portion in FIG. 5B and a 'y' marked portion in FIG. 5C) formed in the process of engraving the vehicle identification number. The burr formed portion, a portion having a burr formed in the process of engraving the vehicle identification number, shows a characteristic in which the slope of the height profile increases sharply compared to the non-engraved portion. In this case, the height of the burr formed portion is not used for calculating the engraved depth of the symbol. Therefore, the system for recognizing a vehicle identification number may be implemented whether or not the engraved symbol has a burr portion.

A vehicle identification number may be engraved by a chemical, mechanical, or laser means. When the vehicle identification number is engraved in the vehicle body with a laser beam, if the laser beam were to be exactly perpendicular to the vehicle body, the burr formed portion would be formed on left and right sides of the engraved portion. However, since generally the laser beam directed to the vehicle body is not perpendicular to the vehicle body exactly, the burr formed portion may be formed only on one side of the engraved portion. The system may calculate the engraved depth of the symbol by using such a characteristic.

The image processor 400 determines a height profile formed in a direction opposite to the slope of the burr formed portion adjacent thereto as the engraved portion (See a 'z' marked portion in FIG. 5B and a 'z' marked portion in FIG. 5C) having the symbol engraved therein. Then, the image processor 400 calculates a lowest height of the engraved portion.

Then, the image processor 400 calculates a height difference between the average height of the non-engraved portion and the lowest height of the engraved portion, and determines the height difference as the engraved depth of the symbol.

Hereinafter, a method for recognizing a vehicle identification number in accordance with an exemplary embodiment of the present disclosure will be described with reference to the attached drawings.

Figure 6:
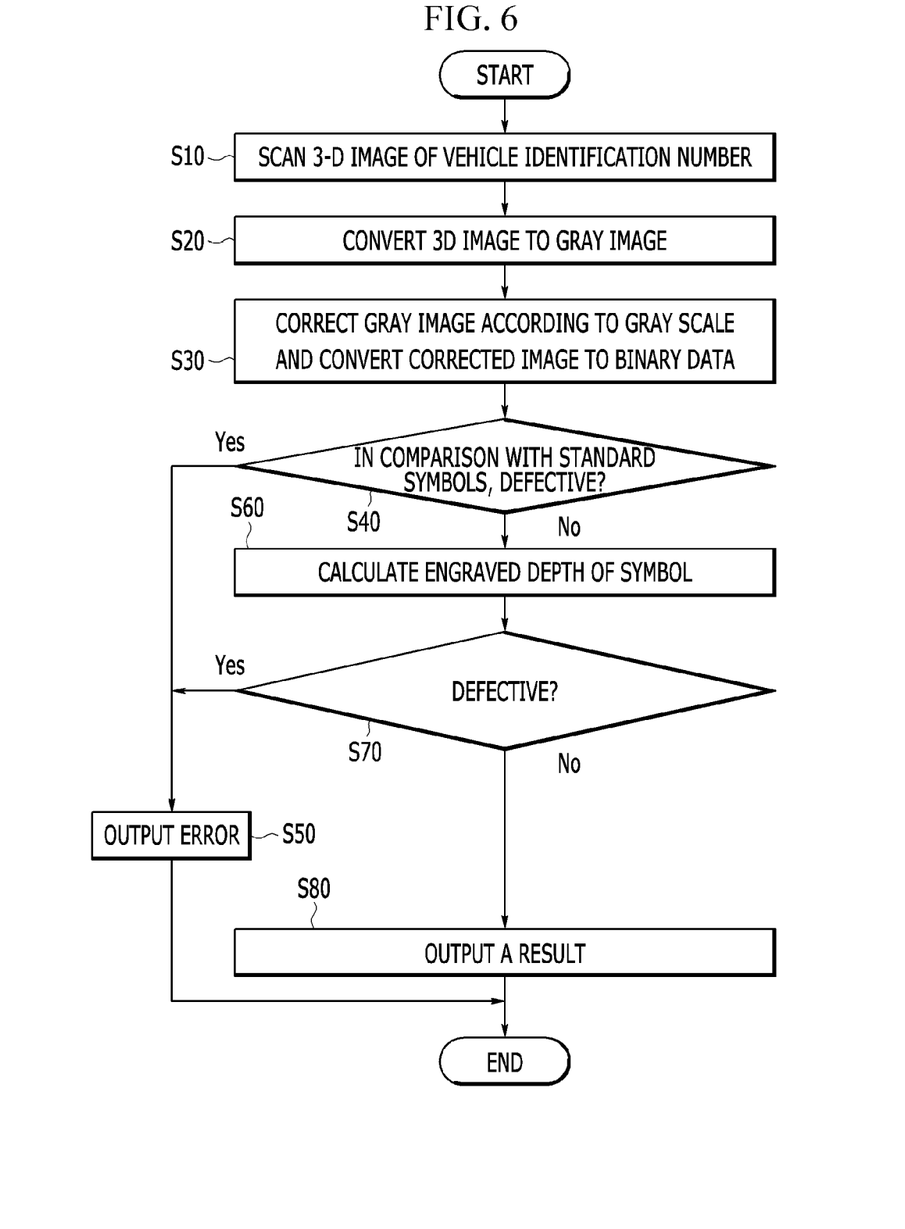
FIG. 6 is a flow chart showing the steps of a method for recognizing a vehicle identification number in accordance with an exemplary embodiment of the present disclosure.

FIG. 6 is a flow chart showing the steps of a method for recognizing a vehicle identification number in accordance with an exemplary embodiment of the present disclosure.

Referring to FIG. 6, the three dimensional scanner 200 moves in the direction in which the vehicle identification number is engraved and scans a three dimensional image (S10).

The image processor 400 converts the image taken in the step S10 into a gray image (S20).

The image processor 400 divides the gray image according to a gray scale and converts the gray image divided thus into a binary data (S30).

As described before, the non-engraved portion having no symbol engraved therein may have a gray scale value in a range of 100-200, and the engraved portion may have the gray scale value in a range of 200-255. The irregular reflection portion may have the gray scale in a range of 0-100. The image may be corrected so that the irregular reflection portion has the same gray scale value as the engraved portion. In certain embodiments, the irregular reflection portion may be processed to have the gray scale of 255 in order to correct the gray image so that the irregular reflection portion is about the same as the engraved portion.

Then, in the corrected image, the engraved portion may be given a binary numeral '1' to convert the engraved portion into white, and the non-engraved portion may be given a binary numeral '0' to convert the non-engraved-portion into black, thereby converting the image corrected thus into a binary data. Alternatively, the engraved portion may be given the binary numeral '0' to convert the engraved portion into black, and the non-engraved portion may be given a binary numeral '1' to convert the non-engraved-portion into white.

The image processor 400 compares the symbol extracted thus to standard symbols to determine whether the symbol engraved thus is defective or not (S40).

In certain embodiments, the image processor 400 may calculate an engraved depth of the symbol (S60).

In detail, the image processor 400 may extract the height profile of the image taken by the three dimensional scanner 200 and calculate the slope of the height profile to divide the height profile into the burr formed portion, the engraved portion and the non-engraved portion.

The image processor 400 may determine a portion of the height profile having the slope smaller than a predetermined value to be the non-engraved portion having no symbols engraved therein and calculate an average value of the non-engraved portion.

The image processor 400 may further determine a portion of the height profile having the slope larger than a reference value in the direction in which the vehicle identification number is scanned (positive direction slopes in FIGS. 5B and 5C) to be the burr formed portion.

The image processor 400 may determine the height profile formed in a direction opposite to the slope of the burr formed portion adjacent thereto (Negative slopes in FIGS. 5B and 5C) as the engraved portion. Then, the image processor 400 may calculate a lowest height of the engraved portion.

The image processor 400 may determine a height difference between the average height of the non-engraved portion and the lowest height of the engraved portion to be the engraved depth.

Finally, the image processor 400 may determine whether the engraved depth of the engraved portion is defective or not (S70), to output an error message if the engraved depth is defective (S50), and output a result if the engraved depth is normal (S80).

Thus, since the engraved depth of the engraved portion having the vehicle identification number engraved therein can be determined, the exemplary embodiment of the present disclosure can accurately determine whether the engraving of the vehicle identification number is defective or not.

While the disclosed inventive concept has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A system for recognizing a vehicle identification number comprising:
   a three dimensional scanner configured to scan, in a direction in which the vehicle identification number is engraved, the vehicle identification number engraved in a vehicle body to obtain an image; and
   an image processor configured to convert the image obtained by the three dimensional scanner into a gray image, to divide the gray image according to a gray scale to extract a symbol in the image corresponding to a symbol engraved in the vehicle body, and to compare the symbol with standard symbols to determine the vehicle identification number.

2. The system of claim 1, wherein the image processor is configured to:
   extract a height profile from the image obtained by the three dimensional scanner;
   identify an engraved portion of the height profile having the symbol engraved therein and a non-engraved portion of the height profile having no symbol engraved therein; and
   calculate an engraved depth of the symbol from an average height of the non-engraved portion and a lowest height of the engraved portion.

3. The system of claim 2, wherein the image processor is configured to determine a portion of the height profile having a slope lower than a reference value as the non-engraved portion having no symbol engraved therein and extract an average value of the non-engraved portion.

4. The system of claim 3, wherein the image processor is configured to determine a portion of the height profile having a slope higher than the reference value in a direction the vehicle identification number is scanned to be a burr formed portion.

5. The system of claim 4, wherein the image processor is configured to:
   determine a portion of the height profile formed in a direction opposite to the slope of the height profile of the burr formed portion as the engraved portion;
   calculate a lowest height of the profile of the engraved portion; and
   determine a difference between the average height of the non-engraved portion and the lowest height of the engraved portion as an engraved depth of the symbol.

6. The system of claim 1 further comprising:
   a transferrer configured to transfer the three dimensional scanner in the direction the vehicle identification number is engraved; and
   a motion controller configured to control the transferrer.

7. The system of claim 1, wherein the symbol is a letter.

8. The system of claim 1, wherein the symbol is a numeral.

9. A method for recognizing a vehicle identification number comprising:
   scanning a vehicle identification number engraved in a vehicle body to obtain a three dimensional image, wherein the scanning is in a direction in which the vehicle identification number is engraved; and
   recognizing the vehicle identification number from the three dimensional image by converting the three dimensional image into a gray image;
   dividing the gray image according to a gray scale to extract a symbol; and
   comparing the symbol to standard symbols to determine the vehicle identification number.

10. The method of claim 9, further comprising the step of extracting a height profile from the three dimensional image, identifying an engraved portion having the symbol engraved therein and a non-engraved portion having no symbol engraved therein, and calculating an engraved depth of the symbol from an average height of the non-engraved portion and a lowest height of the engraved portion.

11. The method of claim 10, wherein the step for calculating the engraved depth includes:
   determining a portion of the height profile as a burr formed portion if the slope of the height profile is higher than a reference value in a direction the vehicle identification number is scanned;
   determining a portion of the height profile with the slope formed in a direction opposite to the burr formed portion adjacent thereto as the engraved portion having the symbol engraved therein, and calculating the lowest height of the engraved portion;
   determining a portion of the height profile with the slope lower than the predetermined value as the non-engraved portion having no symbol engraved therein, and calculating the average height of the non-engraved portion; and
   calculating an engraved depth of the symbol from a height difference of the lowest height of the engraved portion and the average height of the non-engraved portion.

12. The method of claim 9, wherein the symbol is a letter.

13. The method of claim 9, wherein the symbol is a numeral.

\* \* \* \* \*